United States Patent [19]

Castelein

[11] Patent Number: 4,548,988

[45] Date of Patent: Oct. 22, 1985

[54] POLYMERIC MATERIAL CONSISTING OF A MIXTURE OF HIGH-IMPACT POLYSTYRENE, HIGH-DENSITY POLYETHYLENE AND A STYRENE/DIENE BLOCK COPOLYMER

[75] Inventor: Jean Castelein, Mellery, Belgium

[73] Assignee: Montefina S.A., Feluy, Belgium

[21] Appl. No.: 528,168

[22] Filed: Aug. 31, 1983

Related U.S. Application Data

[63] Continuation of Ser. No. 356,662, Mar. 10, 1982, abandoned.

[30] Foreign Application Priority Data

Mar. 12, 1981 [IT] Italy .............................. 20314 A/81

[51] Int. Cl.$^4$ .............................................. C08L 53/02
[52] U.S. Cl. ........................................ 525/71; 525/98
[58] Field of Search ................................... 525/71, 98

[56] References Cited

FOREIGN PATENT DOCUMENTS 4685 10/1979 European Pat. Off. .

Primary Examiner—Carman J. Seccuro

[57] ABSTRACT

Thermoplastic material of high impact resistance, consisting of a homogeneous mixture of high-density polyethylene, high-impact polystyrene and of a styrene/diene block copolymer having a content in styrene below 50% by weight.

2 Claims, No Drawings

POLYMERIC MATERIAL CONSISTING OF A MIXTURE OF HIGH-IMPACT POLYSTYRENE, HIGH-DENSITY POLYETHYLENE AND A STYRENE/DIENE BLOCK COPOLYMER

This application is a continuation of application Ser. No. 356,662, filed Mar. 10, 1982, now abandoned.

THE PRESENT INVENTION

Object of the present invention is a thermoplastic material of a high impact resistance also at low temperatures, suited for the thermoforming at a high-speed cycle.

Said thermoplastic material is obtained by mixing together in a conventional mixing apparatus high-density polyethylene (HDPE), high-impact polystyrene (HIPS) and a styrene/isoprene block copolymer or a styrene/butadiene block copolymer, in which latter case the copolymer is subjected to hydrogenation in order to saturate the residual double bonds.

The term "high-density" polyethylene means a polymer having a density comprised between 0.94 and 0.97.

Processes for obtaining such a type of polymer are quite known to the Prior Art.

The respective quantities of the single components in the polymeric mixture are as follows:
HDPE from 30% to 85% by weight, but preferably from 40% to 50%;
HIPS from 58% to 10% by weight, but preferably from 50% to 40%;
Block copolymer from 5% to 15% by weight, but preferably 10%.

The styrene/diene block copolymer is an elastomeric copolymer of the three or more sequences type having the S-(D-S)$_n$ structure wherein n is a whole number (an integer) preferably 1, S=styrene, D=diene chosen between butadiene and isoprene, the styrene content being below 50% by weight.

The copolymers of this type are quite known to the experts of this field and are described, for instance, in U.S. Pat. Nos. 3,149,182 and 3,390,207.

Said copolymers are generally obtained by anionic polymerization in a solvent, with a polymerization catalyst of the metal-alkyl type such as for instance lithium-alkyl.

In the case of the block copolymer styrene/butadiene, as already indicated previously, after the copolymerization there is carried out a hydrogenation treatment in order to saturate the residual double bonds.

The preparation of the polymeric material, according to this invention, may be carried out by mixing together the polymeric starting products in the form of granules ("pellets"), in a rotating arm mixer, and then by working the mixture in the plastic state, at a high temperature, in a screw extruder-granulator.

The polymeric composition according to this invention displays excellent mechanical properties, shows a high degree of homogeneity, is not subject to delamination and is suitable for the thermo-forming according to conventional thermo-forming methods, in particular by:
injection molding (at temperatures between 180° and 280° C., preferably however at 230° C.);
Extrusion molding (at temperature comprised between 180° and 240° C., but preferably at 225° C.);
Vacuum forming.

EXAMPLE NO. 1

45 parts by weight (p.b.w.) of HDPE ("Finathene 4810 of FINA) were admixed to 45 p.b.w. of HIPS (Cosden 615 by MONTEFINA) together with 10 p.b.w. of a styrene/isoprene/styrene block copolymer (Cariflex TR 1107 by Shell Chemicals containing 86% by weight of isoprene, and showing a melt index equal to 9 g/10 minutes), in a rotary three-arms mixer revolving at 158 rev./min.

The starting materials were in the form of granules ("pellets"). The mixture obtained was then passed through a screw extruder-granulator and was subsequently worked under the following conditions in order to obtain a granulated material:
Type of equipment;
Granulator unit consisting of:
Single screw OMV extruder with a L/D ratio=32; $\phi$ of the screw: 60 mm;
Standard OMV screw for polystyrene;
Kenics type static mixer (9 elements);
Filters used: 20, 60 and 80 mesh;
Nozzle for strings with 10 holes ($\phi$ 3 mm);
Water bath;
Drink tunnel with blower for drying extruded strings;
Granulator or "pellettizer".
Operational conditions:

| | |
|---|---|
| Heating temp. for plastification chamber, zone 1: | 150° C. |
| Heating temp. for plastification chamber, zone 2: | 175° C. |
| Heating temp. for plastification chamber, zone 3: | 160° C. |
| Heating temp. for plastification chamber, zone 4: | 185° C. |
| Heating temp. for plastification chamber, zone 5: | 195° C. |
| Exchanger of the filter: temp. | 200° C. |
| Static mixer: | 205° C. |
| Extrusion head temp.: | 205° C. |
| Pressure at the extrusion head, abt.: | 105 Kg/cm$^2$ |
| Temperature of molten mass: abt. | 210° C. |
| Revolving speed of screw: | 98 rev./min. |
| Power load of motor: abt. | 60 Amp. |

The properties of the product obtained have been recorded on the following table.

EXAMPLE NO. 2

45 parts by weight of HDPE (Dinathene ER 2142 by FINA) were mixed together with 45 parts by weight of HIPS (Cosden 615) and with 10 parts by weight of a hydrogenated styrene/butadiene/styrene block copolymer (Kraton G-1652 by Shell Chemicals), in the same equipment and under the same operational conditions described in example 1.

The properties of the product thereby obtained have been reported on the following table.

The data reported by said table show that a characteristic of considerable interest of the polymeric composition is the excellent impact resistance at low temperatures: at −18° C. the resilience is still of 60%–80% of the resilience at room temperature.

TABLE

| Physical Properties: | Measure unit | Method | Example 1 | Example 2 |
|---|---|---|---|---|
| Properties under tensile stress: | | | | |
| Resistance to tensile stress | N/mm$^2$ | ASTM D 638 | 16 | 20 |
| Elongation | % | ASTM D 638 | 68 | 100 |
| Elasticity modulus | N/mm$^2$ | ASTM D 638 | 670 | 1000 |

TABLE-continued

| Physical Properties: | Measure unit | Method | Example 1 | Example 2 |
|---|---|---|---|---|
| Properties under bending stresses: | | | | |
| Resistance to bending | N/mm$^2$ | ASTM D 790 | 38.9 | 30.4 |
| Elasticity modulus to bending | N/mm$^2$ | ASTM D 790 | 1430 | 1720 |
| Impact resistance: | | | | |
| Izod (with indent): | | | | |
| a + 23° C. | J/m | ASTM D 256 | 117.64 | 65.62 |
| a − 18° C. | J/m | ASTM D 256 | 71.20 | 50.25 |
| "Falling dart" | J | Gardner | >16 | 8.4 |
| Melt flow (200° C./50 N) | g/10 min. | ASTM D 1238 | 6.5 | 4.2 |

What is claimed is:

1. Thermoplastic material having high-impact resistance even at a low temperature, consisting of a homogeneous mixture of, by weight based on the total weight, 40% to 50%, inclusive, of high density polyethylene;

50% to 40%, inclusive, of high-impact polystyrene, and about 10% inclusive, of a styrene/diene block copolymer, with three or more sequences, of the S-(D-S)$_n$ structure wherein n is a whole number or integer, S is a polystyrene block, D is an isoprenic block or hydrogenated butadienic block, with a content in styrene lower than 50% by weight.

2. Thermoplastic material according to claim 1, characterized in that in formula S-(D-S)$_n$, n is 1.

* * * * *